(12) United States Patent
Li et al.

(10) Patent No.: US 11,392,634 B2
(45) Date of Patent: Jul. 19, 2022

(54) CLOUD-BASED LARGE-SCALE PATHOLOGICAL IMAGE COLLABORATIVE ANNOTATION METHOD AND SYSTEM

(71) Applicant: XI'AN JIAOTONG UNIVERSITY, Shaanxi (CN)

(72) Inventors: Chen Li, Shaanxi (CN); Pargorn Puttapirat, Shaanxi (CN); Haichuan Zhang, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 16/831,796

(22) Filed: Mar. 26, 2020

(65) Prior Publication Data
US 2020/0226174 A1 Jul. 16, 2020

(30) Foreign Application Priority Data
Mar. 29, 2019 (CN) .......................... 201910252955.9

(51) Int. Cl.
| | |
|---|---|
| *G06F 16/00* | (2019.01) |
| *G06F 16/58* | (2019.01) |
| *G06T 7/38* | (2017.01) |
| *G06T 7/11* | (2017.01) |
| *G06F 16/51* | (2019.01) |

(52) U.S. Cl.
CPC .............. *G06F 16/58* (2019.01); *G06F 16/51* (2019.01); *G06T 7/11* (2017.01); *G06T 7/38* (2017.01)

(58) Field of Classification Search
CPC . G06F 16/58; G06F 16/51; G06T 7/38; G06T 7/11
See application file for complete search history.

(56) References Cited

U.S. PATENT DOCUMENTS

2017/0178266 A1* 6/2017 Schmidt ................ G06F 40/134

OTHER PUBLICATIONS

Saltz et al, A Containerized Software System for Generation, Management, and Exploration of Features from Whole Slide Tissue Images, Cancer Res, 77(21), e79-82 (Year: 2017).*

(Continued)

*Primary Examiner* — Nancy Bitar
*Assistant Examiner* — Xiao Liu

(57) ABSTRACT

An image preprocessing module is provided by the present invention to pre-process pathological images through super-pixel segmentation in the cloud infrastructure, and meanwhile stores the boundary thereof by using the binary image; and performing multi-user data recording by the data recording module, so that the user can collaborate on image annotation; through the front-end interaction module, the capturing action of the user and displaying the pathological image; through the back-end processing module, the responding to the request sent by the front-end interaction module and completing the annotation of the data and the suggesting possible annotation sub-regions to the users. Through the effects achieved by the above modules, the present invention accomplishes the purpose of multi-user collaborative and convenient pixel-level annotation on pathological images via a webpage.

6 Claims, 1 Drawing Sheet

(56) References Cited

OTHER PUBLICATIONS

Achanta et al, SLIC Superpixels Compared to State-of-the-Art Superpixel Methods, IEEE Transactions on Pattern Analysis and Machine Intelligence, vol. 34, No. 11, Nov. 2012, pp. 2274-2282 (Year: 2012).*

Yang et al, Robust Semantic Template Mathcing Using a Superpixel Region Binary Descriptor, IEEE Transactions on Image Processing, vol. 28, No. 6, Jun. 2019, pp. 3061-3074 (Year: 2019).*

* cited by examiner

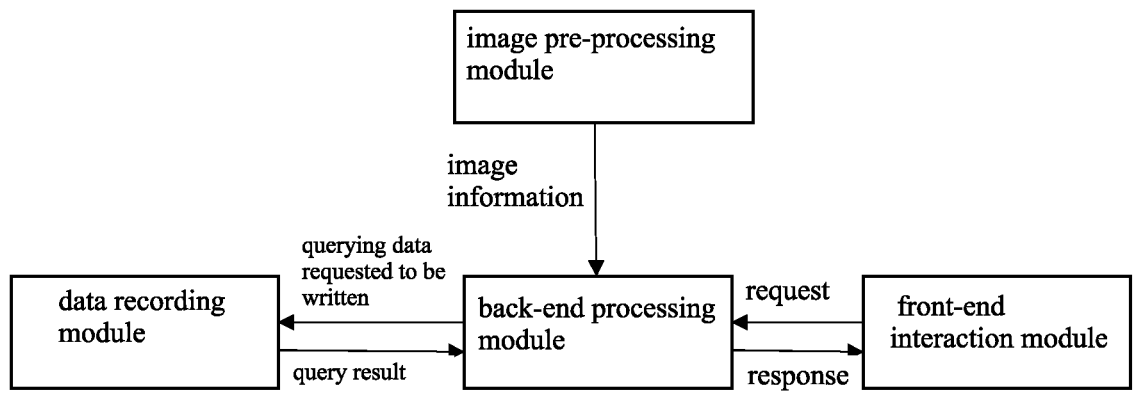

CLOUD-BASED LARGE-SCALE PATHOLOGICAL IMAGE COLLABORATIVE ANNOTATION METHOD AND SYSTEM

CROSS REFERENCE OF RELATED APPLICATION

The present application claims priority under 35 U.S.C. 119(a-d) to CN 201910252955.9, filed Mar. 29, 2019.

BACKGROUND OF THE PRESENT INVENTION

Field of Invention

The present invention relates to the technical field of digital pathology, and more particularly, to a cloud-based large-scale pathological image collaborative annotation method and system.

Description of Related Arts

At present, most of the digital pathology software mainly displays and analyzes pathological images that have been annotated, and lacks capabilities for users to annotate data. For the software that supports users to annotate data, there is only local image annotation software represented by QuPath and server-based image annotation software represented by The Digital Slide Archive, both of which have advantages and disadvantages of their own. The local image annotation software mainly presented by QuPath can perform superpixel segmentation in a small area, and the user is capable of selecting areas to annotate data. However, the disadvantages are also apparent, which are presented in four points as follows. (1) While annotating on different computers, the installation of the software and distribution of the pathological image on each computer is required. Usually, software and pathological images occupy a huge storage space, which has high requirements for computers, and requires professional installation and debugging. (2) After the images are loaded, the software is required to perform superpixel segmentation for each selected area. When selecting a large area or the entire image for superpixel segmentation, it takes a long time to process. Meanwhile, the result of each superpixel segmentation is not capable of being saved, so each time the program is restarted, the image needs to be processed again. (3) At present, there is only a single-machine version, and multiple users are not supported for simultaneous annotation, resulting in an inefficient annotation. (4) The image after the software annotates the data is not standardized, and can only be opened by the software itself, causing a result that data that cannot be analyzed and annotated with other software. The online annotation software represented by the Digital Slide Archive can be annotated online, but the annotation function is simple and only has annotations based on freehand drawing and geometrical or custom polygon shapes, which cannot be used for accurate and convenient annotation.

SUMMARY OF THE PRESENT INVENTION

In view of the problems existed in the conventional art, the present invention provides a cloud-based large-scale pathological image collaborative annotation method and system, which is capable of showing a medical image with convenient pixel-level cloud annotation, and process the image in advance before the user annotates the data. During the user's annotation, the software only consumes resources similar to opening a normal web page. Furthermore, multiple users can share the same server. The software could predict and prompt the user to confirm the annotation according to the system's predictions.

The present invention is achieved by the following technical solutions.

A cloud-based large-scale pathological image collaborative annotation method comprises the following steps of:
an image preprocessing step, comprising:
in cloud infrastructure, performing superpixel segmentation on a plurality of pathological images according to a specified set of sub-region sizes in pixel by parallel processing to obtain multiple sub-regions and boundaries corresponding to an average number of pixels for each of the sub-regions;
a data recording step, comprising:
in a cloud infrastructure, recording new and updating the sub-regions and sub-region boundaries obtained in the image preprocessing step; and
recording and updating sub-region annotation requested independently according to a command of adding or deleting an annotation request performed in the back-end processing step;
the back-end processing step, comprising:
querying based on records from the data recording step; and
according to an image viewing request, a creating sub-region annotation request, a deleting sub-region annotation request, and a suggesting sub-region annotation request obtained in a front-end interaction step, based on the sub-regions obtained in the image preprocessing step.
the front-end interaction step, comprising:
visualizing a processed result of the back-end processing steps; and
according to commands of a user, operation for viewing images and annotating sub-areas captured, so as to respectively form an image viewing request, a creating sub-region annotation request, a deleting sub-region annotation request, and a suggesting sub-region annotation request.

Preferably, the image preprocessing step specifically comprises:
step <1.1>, through parallel processing, simultaneously reading pathological images, and converting into a superpixel segmentation processable format;
step <1.2>: setting an average sub-region size for different levels, wherein each level corresponds to an average number of pixels of different sub-regions;
step <1.3>: segmenting the pathological image repeatedly into a plurality of sub-regions with a different average number of sub-region size in pixel by using a superpixel segmentation algorithm to obtain a sub-region boundary corresponding to the average number of pixels of each sub-region; and
step <1.4>: storing all the segmented sub-region boundaries.

Preferably, the data recording step specifically comprises:
step <2.0>: recording and updating the sub-regions and sub-regions boundaries according to the segmentation;
step <2.1>: if an annotation querying command is received, in a database, according to the user information, querying the sub-region annotated by the user, and return all data queried;
step <2.2>: if a creating sub-region annotation command is received, adding the corresponding record in which the user needs to add to the database; and step <2.3>: if a deleting sub-region annotation command is received, deleting the corresponding record from the database or marking as a deleted sub-region.

Preferably, the back-end processing step specifically comprises:

step <3.1>: if an image viewing request is received, acquiring a position and a size of the area to be processed in the original pathological image, the sub-region size level set by the user, and a position of the invalid annotation in an original pathological image; and performing the following operations:

step [3.1.1]: extracting the area to be processed from the original pathological image, calculating the pixel size used to display the image in the front-end user interaction interface according to the user's screen resolution, and downsampling the extracted image so that the extracted image pixel size meets the required pixel size, and saving in the first layer;

step [3.1.2]: extracting the boundaries of all the sub-regions in the required processing area from the sub-region boundary file corresponding to the sub-region size level, and saving in the second layer;

step [3.1.3]: sending an annotation querying command to the data recording step to obtain all sub-region annotated by the user;

step [3.1.4]: in the second layer, reprocessing the sub-region annotated by the user to be different from other sub-regions;

step [3.1.5]: in the second layer, visualize the invalid points;

step [3.1.6]: merging the first layer and the second layer and then compress the image, and transmit the compressed image to the front-end interaction step;

step <3.2>: if a creating sub-region annotation request is received, extracting all the annotation point information including point coordinates, the sub-region size level and user information in the request; and performing the following operations:

step [3.2.1]: coordinating all annotation points to its sub-region according to the sub-region boundary file corresponding to the sub-region size level;

step [3.2.2]: sending an annotation querying command to the data recording step to obtain the sub-subregions already annotated by the user;

step [3.2.3]: if there is a sub-region that can be annotated, sending a creating sub-region annotation command to the data recording step;

step [3.2.4]: if the annotation sub-region has been already annotated, transmitting the annotation point included in the annotated sub-region back to the front-end interaction step as an invalid point that cannot be annotated;

step [3.2.5]: sending an image processing completion signal to the front-end interaction step;

step <3.3>: if a deleting sub-region annotation request is received, extracting all the annotation point information including point coordinates, the sub-region size level and user information in the request; and performing the following operations:

step [3.3.1]: coordinating all annotation points to its sub-region according to the sub-region boundary file corresponding to the sub-region size level;

step [3.3.2]: sending an annotation querying command to the data recording step to obtain the sub-subregions already annotated by the user;

step [3.3.3]: if the sub-region has already been annotated, sending a deleting sub-region annotation command to the data record step;

step [3.3.4]: if the annotation sub-region has not been annotated, transmitting the annotation point included in the unannotated sub-region back to the front-end interaction step as an invalid point that cannot be annotated;

step [3.3.5]: sending an image processing completion signal to the front-end interaction step;

step <3.4>: if the suggesting sub-region annotation request is received, extracting the user information in the request; and performing following operations:

step [3.4.1]: sending a querying annotation command to the data record step to obtain the sub-regions annotated by the user;

step [3.4.2]: calculating feature vectors for all sub-regions using an image feature extraction algorithm, such as Histogram of Oriented Gradient;

step [3.4.3]: comparing the feature vectors of annotated sub-regions and the feature vectors of unannotated sub-regions, selecting unannotated sub-regions with feature vectors similar to the feature vectors of the annotated sub-regions, and sending the selected sub-regions to the front-end interaction step for displaying.

Preferably, the back-end processing step specifically comprises:

if a data exporting request is received, packaging and storing all sub-area boundary files, pathological images, and user annotation areas, and returning the data packages;

if a changing pathological image request is received, replacing the pathological image and all sub-region boundary files.

Preferably, the front-end interaction step specifically comprises:

step <4.1>: if the user's action of opening open the front-end interaction step is captured, obtaining information of the user; creating the independent back-end processing module instance in the back-end processing module, and sending the image viewing request to the corresponding back-end processing module instance according to the user information; if the user closes the front-end interaction module, closing the corresponding back-end processing module instance;

step <4.2>: if the user's image viewing operation is captured, determining whether the viewing image needs to be updated; if the area to be displayed to the user includes an area that has not been processed before, updating, and sending the image viewing request to the back end processing step; wherein otherwise updating is not performed;

step <4.3>: if the user's action of annotating sub-region is captured or the user's action of deleting annotated sub-region is captured, a creating sub-region annotation requestor a deleting sub-region annotation request to the back-end processing step, and transmitting all recorded annotation points to the back-end processing step; when a processing completion signal is received, sending an image viewing request to the back-end processing step with the invalid points returned by the back-end processing step;

step <4.4>: if the user's changing sub-region size level action is captured, changing the sub-region size level in the sending request, and sending an image viewing request to the back-end processing step;

step <4.5>: if the user's intention to change the displayed pathological image is captured, sending a changing pathological image request to the back-end processing step;

step <4.6>: if a request for exporting data by the user is captured, sending a data exporting request to the back-end processing step;

step <4.7>: if the request of the user to receive annotation suggestion is captured, sending the suggesting sub-region annotation request to the back-end processing step.

Preferably, the front-end interaction module adopts a front-end user interaction interface based on a web browser setting.

A cloud-based large-scale pathological image collaborative annotation system comprises:

an image preprocessing module configured to pre-process a pathological image by superpixel segmentation in the cloud, and store sub-region boundaries using binary image format;

a data recording module configured to simultaneously record multi-user data from multiple users, so as to enable users to collaboratively annotate images;

a plurality of front-end interaction modules configured to complete capture of a user action, generate a corresponding request, send the request to the back-end processing module, and display the pathological image;

a back-end processing module configured to create the back-end processing module instance corresponding to the front-end interaction module, thereby simultaneously responding to multiple requests from a plurality of front-end interaction modules, completing data annotation, and suggesting to the user's possible annotation sub-region, and return data to the corresponding front-end interaction module.

Preferably, based on the method of the present invention, the image preprocessing module, the data recording module, the front-end interaction modules, and the back-end processing module are respectively used for performing the image preprocessing step, the data recording step, the back-end processing step, and the front-end interaction step.

A cloud-based large-scale pathological image collaborative annotation system comprises: a processor and a memory; wherein a program stored in the memory is configured to perform the method mentioned above, the processor is configured to execute the program stored in the memory.

Compared with the conventional art, the present invention has beneficial technical effects as follows.

The invention firstly adopts an image preprocessing module to pre-process pathological images through superpixel segmentation in the cloud infrastructure, and meanwhile stores the boundary by using the binary image format; and performing multi-user data recording by the data recording module, so that the user can collaborate on image annotation; through the front-end interaction module, the capturing action of the user and displaying the pathological image; through the back-end processing module, responses to the request sent by the front-end interaction module and completing the annotation of the data and suggesting possible annotation sub-regions to the users. Through the effects achieved by the above modules, the present invention accomplishes the purpose of multi-user collaborative and convenient pixel-level annotation on a pathological image via a webpage.

BRIEF DESCRIPTION OF THE DRAWINGS

FIG. 1 is a schematic diagram of data processing between modules in the system of the present invention.

DETAILED DESCRIPTION OF THE PREFERRED EMBODIMENT

The present invention is further described in detail with reference to the specific embodiments, which are to be construed as illustrative and not limiting.

The method of the present invention mainly segment a whole slide image by superpixel algorithm in cloud infrastructure, and a user can annotate the image that has been segmented by superpixel algorithm on the webpage, and at the same time constructs its own export file type, so as to solve the problems of current single-machine data annotation software that the computer configuration requirements are high, the processing time is long, and the data that cannot be annotated by multiple users and annotation is not machine-readable.

The cloud-based large-scale pathological image collaborative annotation method comprises the following modules and corresponding steps, Image Preprocessing Module 1.1. Through parallel processing, multiple pathological images are read and converted into a superpixel segmentation supported format in the server.

1.2. Set an average sub-region size for different levels, each level corresponding to an average number of pixels of different sub-regions;

1.3. The pathological image is segmented with GPU repeatedly into a plurality of sub-regions with a different average number for each level by using a superpixel segmentation algorithm, and a sub-region boundary corresponding to the average number of pixels of each sub-region is obtained.

1.4. The boundaries of all segmented sub-regions are stored in a format in which the space occupied by the storage is small, such as a binary image in the disk of the sever.

2. Data recording module 2.1. If an annotation querying command is received, in the database, according to the user information, query the sub-region annotated by the user, and return all data queried.

2.2. If a creating sub-region annotation command is received, in the database, add the corresponding record in which the user needs to add to the database.

2.3. If a deleting sub-region annotation command is received, in the database, delete the corresponding record from the database or mark it as a deleted record.

3. Back-end processing module 3.1. If an image viewing request is received, the location and size of the viewing region to be processed in the original pathological image, the sub-region size level set by the user, and the location of the invalid annotation in the original pathological image are obtained. Then, perform the following operations:

3.1.1. Extract the area to be processed from the original pathological image in the disk, calculate the pixel size used to display the image in the front-end user interaction interface in user's computer according to the user's screen resolution, and resize the extracted image so that the extracted image pixel size meets the required pixel size and save it in the first layer.

3.1.2. Extract the boundaries of all sub-region in the required processing area from the sub-region boundary file in the disk corresponding to the sub-area size level and save it to the second layer.

3.1.3. Send an annotation querying command to the data recording module to obtain the sub-region annotated by the user.

3.1.4. In the second layer, the sub-region annotated by the user is reprocessed to be different from other sub-region. For example, the color filling is applied to the user's annotated area.

3.1.5. In the second layer, display the invalid points;

3.1.6. merge the first layer and the second layer and then compress the image and transmit the compressed image to the front-end interaction step;

3.2. If a creating sub-region annotation request is received, all the annotation point information including point coordinates, the sub-region size level, and user information in the request is extracted, and do the following operations:

3.2.1. Coordinate all annotation points to its sub-region according to the sub-region boundary file corresponding to the sub-region size level;

3.2.2. Send an annotation querying command to the data recording module to obtain the sub-regions that the user has marked.

3.2.3. If there is a sub-region that can be annotated, send a creating sub-region annotation command to the data recording step.

3.2.4. If the annotation sub-region has been already annotated, transmit the annotation point included in the annotated sub-region back to the front-end interaction module as an invalid point that cannot be annotated;

3.2.5. Send an image processing completion signal to the front-end interaction module;

3.3. If a deleting sub-region annotation request is received, extract all the annotation point information including point coordinates, the sub-region size level and user information in the request; and perform the following operations:

3.3.1. Coordinate all annotation points to its sub-region according to the sub-region boundary file corresponding to the sub-region size level;

3.3.2. Send an annotation querying command to the data recording module to obtain the sub-subregion already annotated by the user;

3.3.3. If the sub-region has already been annotated, send a deleting sub-region annotation command to the data record module;

3.3.4. If the annotation sub-region has not been annotated, transmit the annotation point included in the unannotated sub-region back to the front-end interaction module as an invalid point that cannot be annotated;

3.3.5. Send an image processing completion signal to the front-end interaction module;

3.4. If a data exporting request is received, package and store all sub-area boundary files, pathological images, and user annotation areas, and return the data packages;

3.5. If a changing pathological image request is received, replace the pathological image and all sub-region boundary files;

3.6. If the suggesting sub-region annotation request is received, extract the user's information in the request and performing operations as follows:

3.6.1. Send a query mark request to the data recording module to obtain the sub-regions that the user marked;

3.6.2. Calculate a feature vector for all sub-regions by an image feature extraction algorithm, such as Histogram of Oriented Gradient;

3.6.3. Compare the feature vectors of annotated sub-region and the feature vectors of unannotated sub-region, select unannotated sub-regions with feature vector having a similarity greater than a set value by the user similar to the feature vector of the annotated sub-regions, and send the selected sub-regions to the front-end interaction module for displaying.

4. A front-end interaction module; wherein preferably, the front-end interaction module adopts a front-end user interaction interface based on a web browser setting;

4.1. If the user's action of opening open the front-end interaction module is captured, obtain information of the user; create the independent back-end processing module instance in the back-end processing module, and send the image viewing request to the corresponding back-end processing module instance according to the user information; if the user closes the front-end interaction module, close the corresponding back-end processing module instance;

4.2. If the user's image viewing operation is captured, determine whether the viewing image needs to be updated; if the area to be displayed to the user includes an area that has not been processed before, send the image viewing request to the back end processing module; wherein otherwise update is not performed;

4.3. If the user's action of annotating sub-region is captured or the user's action of deleting annotated sub-region is captured, a creating sub-region annotation requestor a deleting sub-region annotation request to the back-end processing module, and transmit all recorded annotation points to the back-end processing module; when a processing completion signal is received, send an image viewing request to the back-end processing module with the invalid points returned by the back-end processing module;

4.4. If the user's changing sub-region size level action is captured, change the sub-region size level in the sending request, and send an image viewing request to the back-end processing module;

4.5. If the user's intention to change the displayed pathological image is captured, send a changing pathological image request to the back-end processing module;

4.6. If a request for exporting data by the user is captured, send a data exporting request to the back-end processing module;

4.7. If the user's request for prompting annotation is captured, send a prompt export annotation to the back-end processing module.

Specifically.

First, writing an image preprocessing module utilizing Matlab;

a) from a directory "./source", reading a pathological image named "example";

b) converting deep zoom images into MATLAB Array format images in the memory by utilizing OpenSlide;

c) performing superpixel segmentation by utilizing the simple linear iterative clustering (SLIC) algorithm to determine cell boundaries with Graphics Processing Unit (GPU);

d) storing the segmented sub-region boundaries as a binary image in the disk.

Second, building the database by a MySQL program, writing the data logging module by the Python language;

a) reading the username, password of the database software and the database name in the configuration file in the disk, and connecting the database on the server by a py-MySQL library;

b) according to the querying, deleting, adding request received, respectively corresponding to SELECT, DELETE, INSERT instructions in the database language, operating on the database on the server, and recording data.

Third, writing the front-end image preview module by JavaScript script, which belongs to part of the front-end interaction module;

a) sending a get access request through jQuery by the front end on the user's computer, and returning the pathological image photo data to the browser by the back-end processing module on the server, including the size of the complete picture, information of the patient and the like;

b) determining the region needed previewing by the browser on the user's computer according to the obtained information, and previewing the whole image by default if there is no specific setting; sending a post request, including the four-corner coordinates of the region to preview, the sub-region size level the unmarkable mark points, and the image processing request, to the back-end processing module in the sever through jQuery.

c) reading the results returned by the back-end processing module in the server and displaying the image on the web page on the user's computer through an open-source image browsing plugin of OpenSeadragon.

d) reading the user's action of dragging or zooming the image operated by mouse or touch screen through OpenSeadragon, moving or zooming the image in the web page on the user's computer.

e) reading the position of the image displayed in the web page on the user's computer by OpenSeadragon, determining whether there is any blank in the image display area and whether the zoom ratio reaches the highest magnification value of the currently acquired image; If the image requires updating, returning to step b, if not required, returning to step d.

Fourth, through JavaScript, writing the data annotation request module, which is another part of the front-end interaction module;

a) reading the action state of the right mouse button by jQuery with user's browser, while triggering the right button to press, reading the cursor position through OpenSeadragon, and storing the cursor coordinates in the coordinate array in user's computer;

b) reading the action state of the right mouse button by jQuery with user's browser, while triggering the release action of the right button, sending the content stored in the coordinate array, the user information saved in COOKIE and the sub-region size level to the back-end processing module by the post request by JQuery;

c) transmitting the un-markable point received from the back-end processing module if no un-markable point, denoting as blank, the information of the region currently being reviewed, and the to the back-end processing module, and sending a request for updating pictures.

Fifth, writing the web page login module by the Flask-WTF component, which is part of the back-end processing module;

a) reading the COOKIE in the user's browser to determine whether the data in the COOKIE is identical to the data of the existing user in the server; if the two are identical, jumping the front-end image preview module in the user's computer to the main page of annotation, otherwise, proceeding to the next step.

b) reading the user name and password entered by the user on the web page to determine whether the user name and password are consistent with the existing user name and password in the database in the server; if yes, proceeding to a next step, otherwise terminating the request.

c) according to the number of annotators currently online, creating a new annotator number and a corresponding ciphertext, and storing them to the database in the server and to the COOKIE in the user's computer.

d) jumping the front-end image preview module in the user's computer to the main page of annotation.

Sixth, writing an image online processing module by Python, which is another part of the back-end processing module;

a) reading the image viewing request sent by the front-end interaction module, obtaining the size and location of the image area that needs to be returned, and reading the points already annotated in the MySQL database in the area;

b) extracting the parts of the pathological image in the disk that need to be displayed by OpenSlide, storing it in the memory, and naming it the original image.

c) copying the binary image in which the sub-region boundary information stores into the memory, utilizing the flooding fill function in OpenCV, coloring the annotated sub-regions in the binary image in memory, and naming the binary image in memory layer 1.

d) creating a new image in memory, and naming it layer 2, drawing points by OpenCV according to the unmarkable point coordinates in all unmarkable marker parameters;

e) by alpha area fill, combining layer 1, 2 with the original image with a transparency of 0.5, and storing in a JPG format in the disk.

Seven, writing an annotation data processing module by Python, which is another part of the back-end processing module;

a) when receiving a post request for data annotation or deletion, sorting all recording data by coordinate in it, and data with coordinates in the same sub-region, only keeping the recording data in that sub-region and deleting others;

b) if the data annotation request is received, proceeding to a next step c; if a data deletion request is received, jumping to d;

c) marking the mark coordinates in the layer 1 of the image online processing module; if marker of the mark coordinates is in a sub-region which is filled with color, that is, the sub-region has already be annotated, transmitting back that coordinate to the front-end interaction module in the user's computer as the unmarkable point coordinates;

d) sending a request to the data logging module in the server to store the points that can be marked in the database or to delete the annotated region.

Eight, writing the annotation suggestion module by Python, which is another part of the back-end processing module;

a) extracting the feature vector of each sub-region of the whole image by the picture feature extraction algorithm of the direction gradient histogram;

b) comparing all the regions in the image with the annotated sub-regions, and when the difference between the feature vectors is less than a threshold, the sub-region is suggested to be annotated with the same degree of the sub-regions with the similar feature vectors;

c) according to the difference of the feature vector, transmitting degrees of the sub-regions sorted by the difference of the feature vectors from the small to the large to the front-end interaction module in the user's computer for displaying to the user for quick selection.

Nine, writing a data export module by Python, which is another part of the back-end processing module;

a) extracting the boundary image after superpixel segmentation in the disk and exporting to the first file 1;

b) extracting all coordinates of all selected areas from the database and exporting to the second file 2; and c) packaging the first file 1 and the second file 2, compressing, encrypting, and saving on the server waiting for downloading.

What is claimed is:

1. A cloud-based large-scale pathological image collaborative annotation method, comprising steps of:
   an image preprocessing step by an image preprocessing module, comprising:
   in cloud infrastructure, performing superpixel segmentation on a plurality of pathological images according to a specified set of sub-region sizes in pixel by parallel processing to obtain multiple sub-regions and boundaries corresponding to an average number of pixels for each of the sub-regions;

a data recording step by a data recording module, comprising:

in cloud infrastructure, recording new and updating the sub-regions and sub-region boundaries obtained in the image preprocessing step; and recording and updating sub-region annotation requested independently according to a command of adding or deleting an annotation request performed in a back-end processing step;

the back-end processing step by a back-end processing module, comprising:

querying based on records from the data recording step; and according to an image viewing request, a creating sub-region annotation request, a deleting sub-region annotation request, and a suggesting sub-region annotation request obtained in a front-end interaction step, based on the sub-regions obtained in the image preprocessing step;

the front-end interaction step by a front-end interaction module, comprising:

visualizing a processing result of the back-end processing steps; and according to commands of a user, operation for viewing images and annotating sub-areas captured, so as to respectively forming an image viewing request, a creating sub-region annotation request, a deleting sub-region annotation request, and a suggesting sub-region annotation request;

wherein the image preprocessing step specifically comprises:

step 1.1, through parallel processing, simultaneously reading pathological images, and converting into a superpixel segmentation processable format;

step 1.2: setting an average sub-region size for different levels, wherein each level corresponds to an average number of pixels of different sub-regions;

step 1.3: segmenting the pathological image repeatedly into a plurality of sub-regions with a different average number of sub-region size in pixel by using a superpixel segmentation algorithm to obtain a sub-region boundary corresponding to the average number of pixels of each sub-region; and step 1.4: storing all the segmented sub-region boundaries;

wherein the data recording step specifically comprises:

step 2.0: recording and updating the sub-regions and sub-regions boundaries according to the segmentation;

step 2.1: if an annotation querying command is received, in a database, according to user information, querying the sub-region annotated by the user, and return all data queried;

step 2.2: if a creating sub-region annotation command is received, adding the corresponding record in which the user needs to add to the database; and step 2.3: if a deleting sub-region annotation command is received, deleting the corresponding record from the database or marking as a deleted record;

wherein the back-end processing step specifically comprises:

step 3.1: if an image viewing request is received, acquiring a position and a size of an area to be processed in the original pathological image, the sub-region size level set by the user, and a position of the invalid annotation in an original pathological image; and performing following operations:

step 3.1.1: extracting the area to be processed from the original pathological image, calculating a pixel size used to display the image in the front-end user interaction interface according to the user's screen resolution, and down-sampling an extracted image so that the extracted image pixel size meets a required pixel size, and saving in a first layer;

step 3.1.2: extracting the boundaries of all the sub-regions in a required processing area from the sub-region boundary file corresponding to the sub-region size level, and saving in a second layer;

step 3.1.3: sending an annotation querying command to the data recording step to obtain all sub-region annotated by the user;

step 3.1.4: in the second layer, reprocessing the sub-region annotated by the user to be different from other sub-regions;

step 3.1.5: in the second layer, visualize the invalid points;

step 3.1.6: merging the first layer and the second layer and then compress the image, and transmit the compressed image to the front-end interaction step;

step 3.2: if a creating sub-region annotation request is received, extracting all the annotation point information including point coordinates, the sub-region size level and user information in the request; and performing the following operations:

step 3.2.1: coordinating all annotation points to its sub-region according to the sub-region boundary file corresponding to the sub-region size level;

step 3.2.2: sending an annotation querying command to the data recording step to obtain the sub-subregion already annotated by the user;

step 3.2.3: if there is a sub-region that can be annotated, sending a creating sub-region annotation command to the data recording step;

step 3.2.4: if the annotation sub-region has been already annotated, transmitting the annotation point included in the annotated sub-region back to the front-end interaction step as an invalid point that cannot be annotated;

step 3.2.5: sending an image processing completion signal to the front-end interaction step;

step 3.3: if a deleting sub-region annotation request is received, extracting all the annotation point information including point coordinates, the sub-region size level and user information in the request; and performing following operations:

step 3.3.1: coordinating all annotation points to its sub-region according to the sub-region boundary file corresponding to the sub-region size level;

step 3.3.2: sending an annotation querying command to the data recording step to obtain the sub-subregion already annotated by the user;

step 3.3.3: if the sub-region has already been annotated, sending a deleting sub-region annotation command to the data record module;

step 3.3.4: if the annotation sub-region has not been annotated, transmitting the annotation point included in the unannotated sub-region back to the front-end interaction step as an invalid point that cannot be annotated;

step 3.3.5: sending an image processing completion signal to the front-end interaction step;

step 3.4: if the suggesting sub-region annotation request is received, extracting the user information in the request; and performing following operations:

step 3.4.1: sending a querying annotation command to the data record module to obtain the sub-region annotated by the user;

step 3.4.2: calculating a feature vector for all sub-regions using an image feature extraction algorithm, such as Histogram of Oriented Gradient;

step 3.4.3: comparing the feature vectors of annotated sub-region and the feature vectors of unannotated sub-region, selecting unannotated sub-regions with feature vector similar to the feature vector of the annotated sub-regions, and sending the selected sub-regions to the front-end interaction step for displaying.

2. The cloud-based large-scale pathological image collaborative annotation method according to claim 1, wherein the back-end processing step specifically comprises:

if a data exporting request is received, packaging and storing all sub-area boundary files, pathological images, and user annotation areas, and returning the data packages;

if a changing pathological image request is received, replacing the pathological image and all sub-region boundary files.

3. The cloud-based large-scale pathological image collaborative annotation method according to claim 1, wherein the front-end interaction step specifically comprises:

step 4.1: if the user's action of opening open the front-end interaction step is captured, obtaining information of the user; creating the independent back-end processing module instance in the back-end processing module, and sending the image viewing request to the corresponding back-end processing module instance according to the user information; if the user closes the front-end interaction module, closing the corresponding back-end processing module instance;

step 4.2: if the user's image viewing operation is captured, determining whether the viewing image needs to be updated; if the area to be displayed to the user includes an area that has not been processed before, updating, and sending the image viewing request to the back end processing step; wherein otherwise updating is not performed;

step 4.3: if the user's action of annotating sub-region is captured or the user's action of deleting annotated sub-region is captured, a creating sub-region annotation requestor a deleting sub-region annotation request to the back-end processing step, and transmitting all recorded annotation points to the back-end processing step; when a processing completion signal is received, sending an image viewing request to the back-end processing step with the invalid points returned by the back-end processing step;

step 4.4: if the user's changing sub-region size level action is captured, changing the sub-region size level in the sending request, and sending an image viewing request to the back-end processing step;

step 4.5: if the user's intention to change the displayed pathological image is captured, sending a changing pathological image request to the back-end processing step;

step 4.6: if a request for exporting data by the user is captured, sending a data exporting request to the back-end processing step;

step 4.7: if the request of the user to receive annotation suggestion is captured, sending the suggesting sub-region annotation request to the back-end processing step.

4. The cloud-based large-scale pathological image collaborative annotation method, according to claim 3, wherein the front-end interaction module adopts a front-end user interaction interface based on a web browser setting:

firstly, writing an image preprocessing module utilizing MATLAB;

a) from a directory "./source", reading a pathological image named "example";

b) converting deep zoom images into MATLAB Array format images in a memory by utilizing OpenSlide;

c) performing superpixel segmentation by utilizing a simple linear iterative clustering (SLIC) algorithm to determine cell boundaries with Graphics Processing Unit (GPU);

d) storing the segmented sub-region boundaries as a binary file on a disk;

secondly, building a database by a MySQL database, writing a data logging module by Python programming language;

a) reading the username, password of the database software and the database name in a configuration file on the disk, and connecting to the database on a server by a py-MySQL library;

b) according to the querying, deleting, adding request received, respectively corresponding to SELECT, DELETE, INSERT instructions in the database language, operating on the database on the server, and recording data;

thirdly, writing a front-end image preview module by JavaScript, which belongs to part of the front-end interaction module;

a) sending a get access request through jQuery by the front end on the user's computer, and returning the pathological image photo data to the browser by the back-end processing module on the server, including the size of the complete image, information of the patient and the file;

b) determining the region needed previewing by the browser on the user's computer according to the obtained information, and previewing the whole image by default if there is no specific setting; sending a post request, including the four-corner coordinates of the region to preview, the sub-region size level the invalid mark points, and the image processing request, to the back-end processing module in the sever through j Query;

c) reading the results returned by the back-end processing module in the server and displaying the image on a web page on the user's computer through an open-source image browsing plugin called OpenSeadragon;

d) reading the user's action of dragging or zooming the image operated by mouse or touch screen through OpenSeadragon, moving or zooming the image in the web page on the user's computer;

e) reading the position of the image displayed in the web page on the user's computer by OpenSeadragon, determining whether there is any blank in the image display area and whether a zoom ratio reaches the highest magnification value of the currently acquired image; If the image requires updating, returning to step b, if not required, returning to step d;

fourthly, through JavaScript, writing a data annotation request module, which is another part of the front-end interaction module;

a) reading the action state of the right mouse button by jQuery with user's browser, while triggering the right button to press, reading the cursor position through OpenSeadragon, and storing the cursor coordinates in the coordinate array in user's computer;
b) reading the action state of the right mouse button by jQuery with user's browser, while triggering the release action of the right button, sending the content stored in the coordinate array, the user information saved in COOKIE and the sub-region size level to the back-end processing module by the post request by jQuery;
c) transmitting the invalid point received from the back-end processing module if no invalid point, denoting as blank, the information of the region currently being reviewed, and the to the back-end processing module, and sending a request for updating pictures;

fifthly, writing a web page login module by the Flask-WTF component, which is part of the back-end processing module;
a) reading the COOKIE in the user's browser to determine whether the data in the COOKIE is identical to the data of the existing user in the server; if the two are identical, jumping the front-end image preview module in the user's computer to the main page of annotation, otherwise, proceeding to the next step;
b) reading the username and password entered by the user on the web page to determine whether the username and password are consistent with the existing username and password in the database in the server; if yes, proceeding to a next step, otherwise terminating the request;
c) according to the number of annotators currently online, creating a new annotator number and a corresponding ciphertext, and storing them to the database in the server and to the COOKIE in the user's computer;
d) jumping the front-end image preview module in the user's computer to the main page of annotation;

sixthly, writing an image online processing module by Python, which is another part of the back-end processing module;
a) reading the image viewing request sent by the front-end interaction module, obtaining the size and location of the image area that needs to be returned, and reading the points already annotated in the MySQL database in the area;
b) extracting the parts of the pathological image in the disk that need to be displayed by OpenSlide, storing it in the memory, and naming it an original image;
c) copying the binary image in which the sub-region boundary information stores into the memory, utilizing the floodfill function in OpenCV, coloring the annotated sub-regions in the binary image in memory, and naming the binary image in memory layer 1;
d) creating a new image in memory, and naming it layer 2, drawing points by OpenCV according to the invalid point coordinates in all invalid marker parameters;
e) by alpha blending, merge layer 1 and 2 with the original image with a transparency of 0.5, and storing in a JPG format in the disk;

seventhly, writing an annotation data processing module by Python, which is another part of the back-end processing module;
a) when receiving a post request for data annotation or deletion, sorting all recording data by coordinate in it, and data with coordinates in the same sub-region, only keeping the recording data in that sub-region and deleting others;
b) if the data annotation request is received, proceeding to a next step c; if a data deletion request is received, jumping to d;
c) marking mark coordinates in the layer 1 of the image online processing module; if marker of the mark coordinates is in a sub-region which is filled with color, that is, the sub-region has already been annotated, transmitting back that coordinate to the front-end interaction module in the user's computer as the invalid point coordinates;
d) sending a request to the data logging module in the server to store the points that can be marked in the database or to delete the annotated region;

eighthly, writing an annotation suggestion module by Python, which is another part of the back-end processing module;
a) extracting a feature vector of each sub-region of the whole image by the picture feature extraction algorithm of the direction gradient histogram;
b) comparing all the regions in the image with the annotated sub-regions, and when the difference between the feature vectors is less than a threshold, the sub-region is suggested to be annotated with the same degree of the sub-regions with the similar feature vectors;
c) according to the difference of the feature vector, transmitting degrees of the sub-regions sorted by the difference of the feature vectors from the small to the large to the front-end interaction module in the user's computer for displaying to the user for quick selection;

ninthly, writing a data export module by Python, which is another part of the back-end processing module;
a) extracting a boundary image after superpixel segmentation in the disk and exporting to a first file 1;
b) extracting all coordinates of all selected areas from the database and exporting to a second file 2; and
c) packaging the first file 1 and the second file 2, compressing, encrypting, and saving on the server waiting for downloading.

5. A cloud-based large-scale pathological image collaborative annotation system comprises:
an image preprocessing module configured to pre-process a pathological image by superpixel segmentation in a cloud, and store a sub-region boundary using binary image format;
a data recording module configured to simultaneously record multi-user data from multiple users, so as to enable users to collaboratively annotate images;
a plurality of front-end interaction modules configured to complete capture of a user action, generate a corresponding request, send the request to a back-end processing module, and display the pathological image;
the back-end processing module configured to create a back-end processing module instance corresponding to a front-end interaction module, thereby simultaneously responding to multiple requests from a plurality of front-end interaction modules, completing data annotation, and suggesting to a user's possible annotation sub-region, and return data to the corresponding front-end interaction module:
wherein based on the claim 1, the image preprocessing module, the data recording module, the front-end interaction modules, and the back-end processing module are respectively used for performing the image preprocessing step, the data recording step, the back-end processing step, and the front-end interaction step.

6. A cloud-based large-scale pathological image collaborative annotation system, comprising: a processor and a memory; wherein a program stored in the memory is configured to perform the method of claim 1, the processor is configured to execute the program stored in the memory.

\* \* \* \* \*